United States Patent
Harvey

(10) Patent No.: US 10,654,372 B2
(45) Date of Patent: May 19, 2020

(54) CONTROLLING POWER TO A UTILITY VEHICLE

(71) Applicant: Textron Inc., Providence, RI (US)

(72) Inventor: Arthur James Harvey, Beech Island, SC (US)

(73) Assignee: Textron Innovations Inc., Providence, RI (US)

( * ) Notice: Subject to any disclaimer, the term of this patent is extended or adjusted under 35 U.S.C. 154(b) by 47 days.

(21) Appl. No.: 16/163,930

(22) Filed: Oct. 18, 2018

(65) Prior Publication Data

US 2020/0122583 A1    Apr. 23, 2020

(51) Int. Cl.
| | | |
|---|---|---|
| B60L 53/14 | (2019.01) | |
| B60L 58/10 | (2019.01) | |
| H01M 10/052 | (2010.01) | |
| H02J 7/00 | (2006.01) | |
| B60L 53/22 | (2019.01) | |

(52) U.S. Cl.
CPC ............... B60L 53/22 (2019.02); B60L 58/10 (2019.02); H01M 10/052 (2013.01); H02J 7/0068 (2013.01)

(58) Field of Classification Search
CPC combination set(s) only.
See application file for complete search history.

(56) References Cited

U.S. PATENT DOCUMENTS

| | | |
|---|---|---|
| 5,934,051 A | 8/1999 | Hahn |
| 6,109,009 A | 8/2000 | Benson |
| 6,339,916 B1 | 1/2002 | Benson |
| 7,332,881 B2 | 2/2008 | Clark et al. |
| 7,560,882 B2 | 7/2009 | Clark et al. |
| 7,800,345 B2 | 9/2010 | Yun et al. |
| 7,825,616 B2 | 11/2010 | Clark et al. |
| 7,926,889 B2 | 4/2011 | Bell, Jr. et al. |

(Continued)

FOREIGN PATENT DOCUMENTS

| | | |
|---|---|---|
| EP | 1655830 | 5/2006 |
| EP | 2858202 | 4/2015 |

(Continued)

OTHER PUBLICATIONS

Anonymous: "SAE Electric Vehicle and Plug in Hybrid Electric Vehicle Conductive Charge Coupler", SAE Standard, SAE International, US vol. J1772_201210, Oct. 15, 2012, pp. 1-93.

(Continued)

*Primary Examiner* — Cortez M Cook
(74) *Attorney, Agent, or Firm* — BainwoodHuang

(57) ABSTRACT

A utility vehicle includes a utility vehicle body, a set of electrical loads supported by the utility vehicle body, and a power control assembly supported by the utility vehicle body and coupled with the set of electrical loads. The power control assembly includes an electro-mechanical contactor constructed and arranged to carry high current, a low power switching device constructed and arranged to carry low current, and control circuitry coupled to the electro-mechanical contactor and the low power switching device. The control circuitry is constructed and arranged to separately open and close each of the electro-magnetic contactor and the low power switching device to control power delivery from a lithium battery to the set of electrical loads.

20 Claims, 5 Drawing Sheets

(56) References Cited

U.S. PATENT DOCUMENTS

| | | |
|---|---|---|
| D652,349 S | 1/2012 | Kristensen |
| 8,120,291 B2 | 2/2012 | Clark et al. |
| 8,201,897 B2 | 6/2012 | Bell, Jr. et al. |
| 8,596,391 B2 | 12/2013 | Kshatriya |
| 8,604,749 B2 | 12/2013 | Kwag et al. |
| 8,714,572 B1 | 5/2014 | Singletary et al. |
| 9,050,899 B2 | 6/2015 | Seol |
| 9,371,067 B2 | 6/2016 | Dao et al. |
| 9,387,775 B2 | 7/2016 | Baek et al. |
| 9,436,261 B2 | 9/2016 | Yun |
| 9,508,982 B2 | 11/2016 | Kim et al. |
| 9,553,460 B2 | 1/2017 | Dao et al. |
| 9,592,743 B2 | 3/2017 | Haug |
| 9,595,847 B2 | 3/2017 | Dao et al. |
| 9,806,341 B2 | 10/2017 | Lee et al. |
| 9,806,545 B2 | 10/2017 | Fink |
| 10,017,169 B1 | 7/2018 | Harvey et al. |
| 10,195,953 B2 | 2/2019 | Harvey et al. |
| 2010/0123438 A1 | 5/2010 | Harada |
| 2013/0088198 A1 | 4/2013 | Masuda |
| 2013/0241502 A1 | 9/2013 | Sowden |
| 2014/0002020 A1 | 1/2014 | Geber et al. |
| 2014/0091764 A1 | 4/2014 | Kinomura et al. |
| 2014/0225559 A1 | 8/2014 | Sugano |
| 2015/0130414 A1 | 5/2015 | Izumi |
| 2016/0212885 A1* | 7/2016 | Ikeda ............... B60W 30/1843 |
| 2016/0227628 A1* | 8/2016 | Lydecker ............. H05B 47/105 |
| 2016/0347302 A1 | 12/2016 | Niwa et al. |
| 2019/0319472 A1 | 10/2019 | Lebreux |

FOREIGN PATENT DOCUMENTS

| | | |
|---|---|---|
| EP | 3043417 | 7/2016 |
| WO | 20130024533 | 2/2013 |
| WO | 20130129217 | 9/2013 |
| WO | 20160133453 | 8/2016 |

OTHER PUBLICATIONS

Garia, "Introducing the New Garia Golf", http://www.garia.com/news/introducing-the-new-garia-golf/, Sep. 15, 2016.

* cited by examiner

CONTROLLING POWER TO A UTILITY VEHICLE

BACKGROUND

A lithium-battery powered utility vehicle includes a traction control system having a traction controller, a primary contactor and an electric motor. When a driver pushes down on a foot pedal, the traction controller sends a primary contactor signal to the primary contactor that closes the primary contactor thus connecting a lithium-battery pack to the electric motor to provide electric power to the electric motor.

The lithium-battery pack includes a lithium-battery controller, a secondary contactor and a lithium battery. The secondary contactor of the lithium-battery pack is different from the primary contactor of the traction control system although both are high-current electro-magnetic contactors capable of carrying high current for the electric motor. When the remaining amount of charge in the lithium battery drops to a low level, the lithium-battery controller turns off a secondary contactor signal that holds the secondary contactor closed. As a result, the secondary contactor opens thus preventing further discharging of the lithium battery.

SUMMARY

Improved techniques are directed to provisioning a utility vehicle with a power control assembly having an electro-mechanical contactor to carry high current and a low power switching device or circuit (e.g., a relay, a solid-state switch, one or more discrete transistors, etc.) to carry low current. Such a power control assembly is able to effectively and efficiently control power delivery from a lithium battery to the various loads of the utility vehicle as well as prevent the lithium battery from over-discharging to an unsafe level. Moreover, such a power control assembly does not require multiple high-current contactors (i.e., one for the traction control system and another for the lithium-battery pack). Rather, the electro-mechanical contactor operates to carry high current (e.g., for electric motor operation) and the low power switching device operates to carry low current (e.g., to power a set of low-power loads of the utility vehicle). Along these lines, the electro-mechanical contactor and the low power switching device may operate independently (e.g., the electro-mechanical contactor may frequently open/close to operate an electric motor while the low power switching device remains closed to continue powering auxiliary devices). If the amount of charge on the lithium battery drops to a predefined level, both the electro-mechanical contactor and the low power switching device can open in order to prevent further discharging of the lithium battery.

One embodiment is directed to a power control assembly to control power delivery to a utility vehicle. The power control assembly includes an electro-mechanical contactor constructed and arranged to carry high current, and a low power switching device constructed and arranged to carry low current. The power control assembly further includes control circuitry coupled to the electro-mechanical contactor and the low power switching device. The control circuitry is constructed and arranged to separately open and close each of the electro-magnetic contactor and the low power switching device to control power delivery from a lithium battery to a set of loads of the utility vehicle.

In some arrangements, the power control assembly further includes a lithium battery coupled to each of the electro-mechanical contactor, the low power switching device, and the control circuitry. The lithium battery provides power to the control circuitry to enable the control circuitry to open and close each of the electro-magnetic contactor and the low power switching device.

In some arrangements, the power control assembly further includes an assembly chassis on which the electro-mechanical contactor, the low power switching device, the control circuitry, and the lithium battery are mounted. The assembly chassis provides the control assembly with a form factor that enables the control assembly to be physically installed on to the utility vehicle as a single unit.

In some arrangements, the control circuitry is constructed and arranged to:
  (i) open both the electro-mechanical contactor and the low power switching device concurrently to prevent further discharging of the lithium battery,
  (ii) open the electro-mechanical contactor and close the low power switching device concurrently to deliver power at low current to the set of loads of the utility vehicle, and
  (iii) close both the electro-mechanical contactor and the low power switching device concurrently to deliver both power at high current and power at low current to the set of loads of the utility vehicle.

In some arrangements, the electro-mechanical contactor includes a first set of contactor terminals that couple to the lithium battery and a second set of contactor terminals constructed and arranged to connect to an electric motor bus leading to an electric motor of the utility vehicle. Additionally, the low power switching device includes a first set of switch contacts that couple to the lithium battery and a second set of switch contacts constructed and arranged to connect to a low power bus leading to low power electronic components of the utility vehicle.

In some arrangements, the electro-mechanical contactor includes (i) a bridging element that is movable between a closed position in which the bridging element connects the first set of contactor terminals and the second set of contactor terminals together and an open position in which the bridging element disconnects the first set of contactor terminals and the second set of contactor terminals from each other, (ii) a spring mechanism that biases the bridging element to the open position and (iii) a coil that moves the bridging element to the closed position in response to a contactor signal from the control circuitry. Additionally, the low power switching device includes a solid-state switch that is constructed and arranged to provide (i) isolation between the first set of switch contacts and the second set of switch contacts in the absence of a switch signal from the control circuitry and (ii) a set of current pathways between the first set of switch contacts and the second set of switch contacts in response to the switch signal from the control circuitry.

In some arrangements, the contactor signal has a first amount of current, the switch signal has a second amount of current. The second amount of current may be significantly lower than the first amount of current since the amount of current required to operate the low power switching device is much less than the amount of current required to operate an electro-mechanical contactor.

In some arrangements, the control circuitry includes a safety circuit that protects the lithium battery from entering an over-discharged condition. The safety circuit keeps both the electro-mechanical contactor and the low power switching device concurrently open when the lithium battery has transitioned from a normal state of charge state to a low state of charge state.

In some arrangements, the safety circuitry is constructed and arranged to:
(A) draw power from the lithium battery to (i) close the low power switching device and (ii) enable closure of the electro-mechanical contactor when the lithium battery has at least a predefined amount of charge, and
(B) no longer draw power from the lithium battery (i) open the low power switching device and (ii) disable closure of the electro-mechanical contactor when the lithium battery has less than the predefined amount of charge.

In some arrangements, the safety circuit includes a first set of current sensors that measure current provided by the lithium battery through the electro-mechanical contactor, and a second set of current sensors that measure current provided by the lithium battery through the low power switching device.

In some arrangements, when the lithium battery is in the normal state of charge state, the control circuitry (i) enables the electro-mechanical contactor to transition between an opened position and a closed position and (ii) maintains closure of the low power switching device.

In some arrangements, the control circuitry is constructed and arranged to:
(A) close the electro-mechanical contactor when the lithium battery is in the normal state of charge state and the control circuitry receives an "energize motor" command signal from a motor controller of the utility vehicle, and
(B) open the electro-mechanical contactor when the lithium battery is in the normal state of charge state and the control circuitry no longer receives the "energize motor" command signal from the motor controller of the utility vehicle.

In some arrangements, the control circuitry is constructed and arranged to:
(A) close the electro-mechanical contactor when the lithium battery is in the normal state of charge state, the control circuitry receives an "external charger present" signal from a motor controller of the utility vehicle, and the lithium battery is less than fully charged, and
(B) open the electro-mechanical contactor when the lithium battery is in the normal state of charge state, the control circuitry receives the "external charger present" signal from the motor controller of the utility vehicle, and the lithium battery is fully charged.

In some arrangements, the set of low power loads of the utility vehicle includes persistent memory that stores a log of utility vehicle events. Additionally, the control circuitry includes a communications interface constructed and arranged to provide lithium battery status for entrance in the log stored in the persistent memory.

In some arrangements, the electro-mechanical contactor provides a first voltage when the electro-mechanical contactor is closed. Additionally, the low power switching device provides a second voltage when the low power switching device is closed. Furthermore, the first voltage (e.g., 48 volts) is higher than the second voltage (e.g., 12 volts).

In some arrangements, the electro-mechanical contactor provides a first voltage when the electro-mechanical contactor is closed. Additionally, the low power switching device provides a second voltage when the low power switching device is closed. Furthermore, the first voltage and the second voltage are equal (e.g., both are 48 volts).

In some arrangements, the set of low power loads of the utility vehicle includes persistent memory that stores a log of utility vehicle events. Additionally, the control circuitry is constructed and arranged to provide power to the persistent memory through the low power switching device and write lithium battery status to the log stored in the persistent memory.

Another embodiment is directed to a utility vehicle which includes a utility vehicle body, a set of electrical loads supported by the utility vehicle body, and a power control assembly supported by the utility vehicle body and coupled with the set of electrical loads. The power control assembly includes an electro-mechanical contactor constructed and arranged to carry high current, a low power switching device such as a solid-state switch constructed and arranged to carry low current, and control circuitry coupled to the electro-mechanical contactor and the low power switching device. The control circuitry is constructed and arranged to separately open and close each of the electro-magnetic contactor and the low power switching device to control power delivery from a lithium battery to the set of electrical loads.

In some arrangements, the set of loads includes (i) an electric motor coupled to the electro-mechanical contactor and (ii) auxiliary loads coupled to the low power switching device. Additionally, the electro-mechanical contactor controls delivery of traction power to the electric motor. Furthermore, the low power switching device controls delivery of auxiliary power to the auxiliary loads.

Yet another embodiment is directed to a method of controlling power delivery to loads of a utility vehicle. The method includes, while a solid-state switch (or similar low power switching component) is closed to carry low current from a lithium battery to a set of low power loads of the utility vehicle and while the lithium battery has a normal state of charge state, closing an electro-mechanical contactor to provide access to high current from the lithium battery to an electric motor of the utility vehicle to operate the electric motor of the utility vehicle. The method further includes, while the solid-state switch is still closed to continue carrying low current from the lithium battery to the set of low power loads of the utility vehicle and while the lithium battery continues to have the normal state of charge state, opening the electro-mechanical contactor to no longer provide access to high current from the lithium battery to the electric motor of the utility vehicle. The method further includes, after opening the electro-mechanical contactor and in response to a transition of the lithium battery from the normal state of charge state to a low state of charge state, opening the solid-state switch to prevent further discharging of the lithium battery.

Other embodiments are directed to higher and lower level systems, assemblies, apparatus, processing circuits, etc. Some embodiments are directed to various processes, electronic components and circuitry which are involved in controlling power to a utility vehicle.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to operating a utility vehicle with a power control assembly having an electro-mechanical contactor to carry high current and a low power switching device to carry low current. Such a power control assembly is able to effectively and efficiently control power delivery from a lithium battery to the various loads of the utility vehicle as well as prevent the lithium battery from over-discharging to an unsafe level. Moreover, such a power control assembly does not require multiple high-current contactors (i.e., one for the traction control system and another for the lithium-battery pack). Rather, the electro-mechanical contactor operates to carry high current (e.g., for electric motor operation) and the low power switching device operates to carry low current (e.g., to power a set of low-power loads of the utility vehicle). Along these lines, the electro-mechanical contactor and the low power switching device may operate independently (e.g., the electro-mechanical contactor may frequently open/close to operate an electric motor while the low power switching device remains closed to continue powering auxiliary devices). If the amount of charge on the lithium battery drops to a predefined level, both the electro-mechanical contactor and the low power switching device can open in order to prevent further discharging of the lithium battery.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
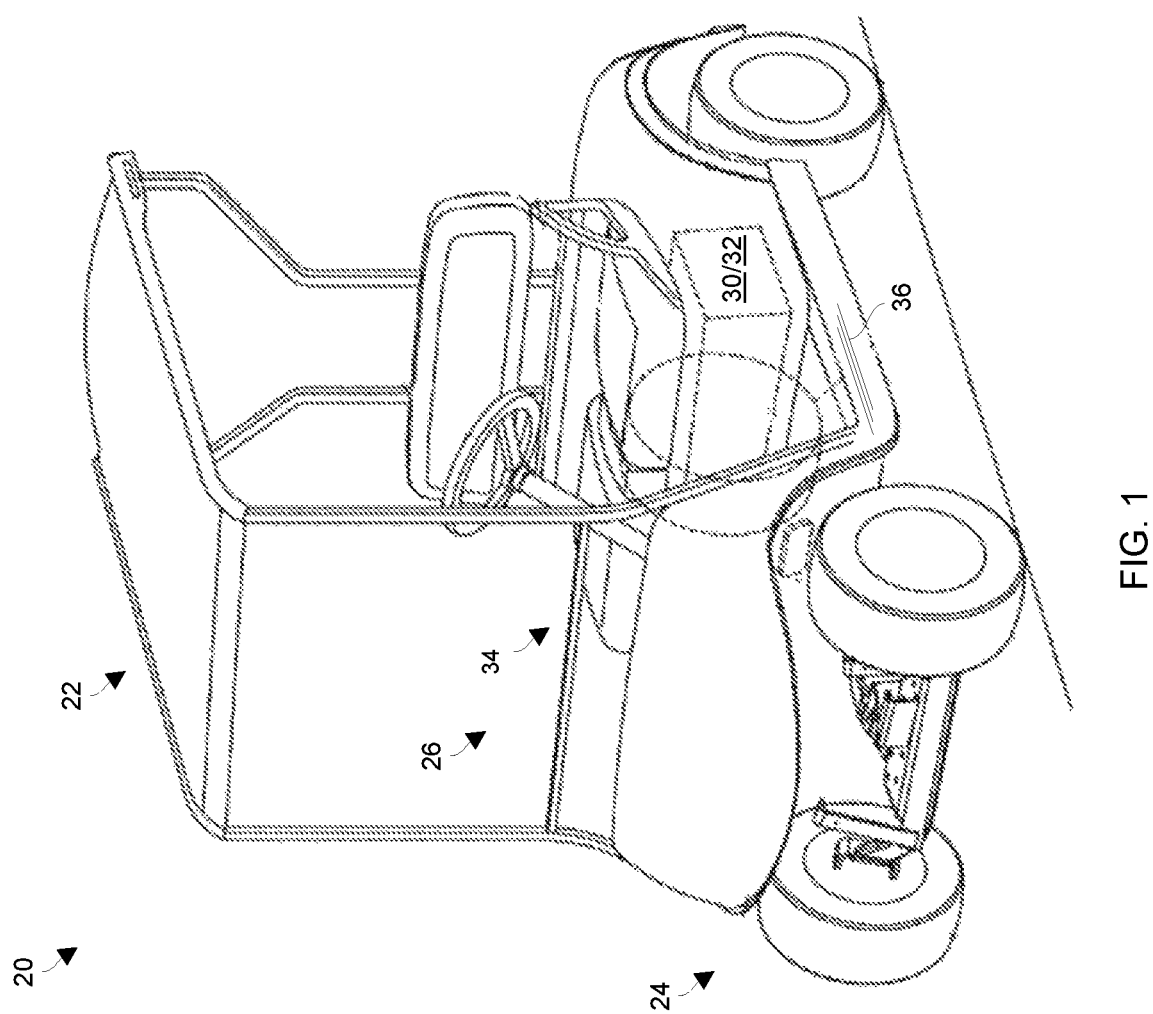
FIG. 1 is a perspective view of an example utility vehicle which controls electrical access to a lithium battery.

FIG. 1 shows an example utility vehicle 20 which controls electrical access to a lithium battery. The utility vehicle 20 includes, among other things, a utility vehicle body 22 (e.g., a chassis, a frame, etc.), a set of tires (or wheels) 24, and an electrical system 26. It should be understood that the utility vehicle 20 has the form factor of a golf car by way of example only and that other form factors are suitable for use as well such as those of personal transport vehicles, food and beverage vehicles, hospitality vehicles, all-terrain vehicles (ATVs), utility task vehicles (UTVs), motorcycles, scooters, vehicles for specialized applications, as well as other lightweight electric vehicles.

In certain embodiments, such as the example of FIG. 1 in which the utility vehicle 20 is a golf car, the golf car may include an operator seating area covered by a canopy supported by a plurality of struts. The golf car may further comprise a rear bag well area disposed rearward of the operator seating area and configured to carry one or more golf bags and/or other cargo. In some embodiments, the rear bag well area may support a rear facing seat for carrying additional passengers and/or a convertible rear seat kit configured to convert to a cargo deck for carrying cargo.

In accordance with certain embodiments, the electrical system 26 includes a motor system 30, a lithium battery system 32, additional components 34, cabling 36, and so on. The additional components 34 may include a set of user controls (e.g., a foot pedal, a keyed switch, a maintenance switch, etc.), auxiliary components (e.g., headlights, a fan, a radio, a navigation system, etc.), specialized equipment (e.g., a refrigerator, robotics, etc.), and so on. Further details will now be provided with reference to FIGS. 2 and 3.

Figure 2:
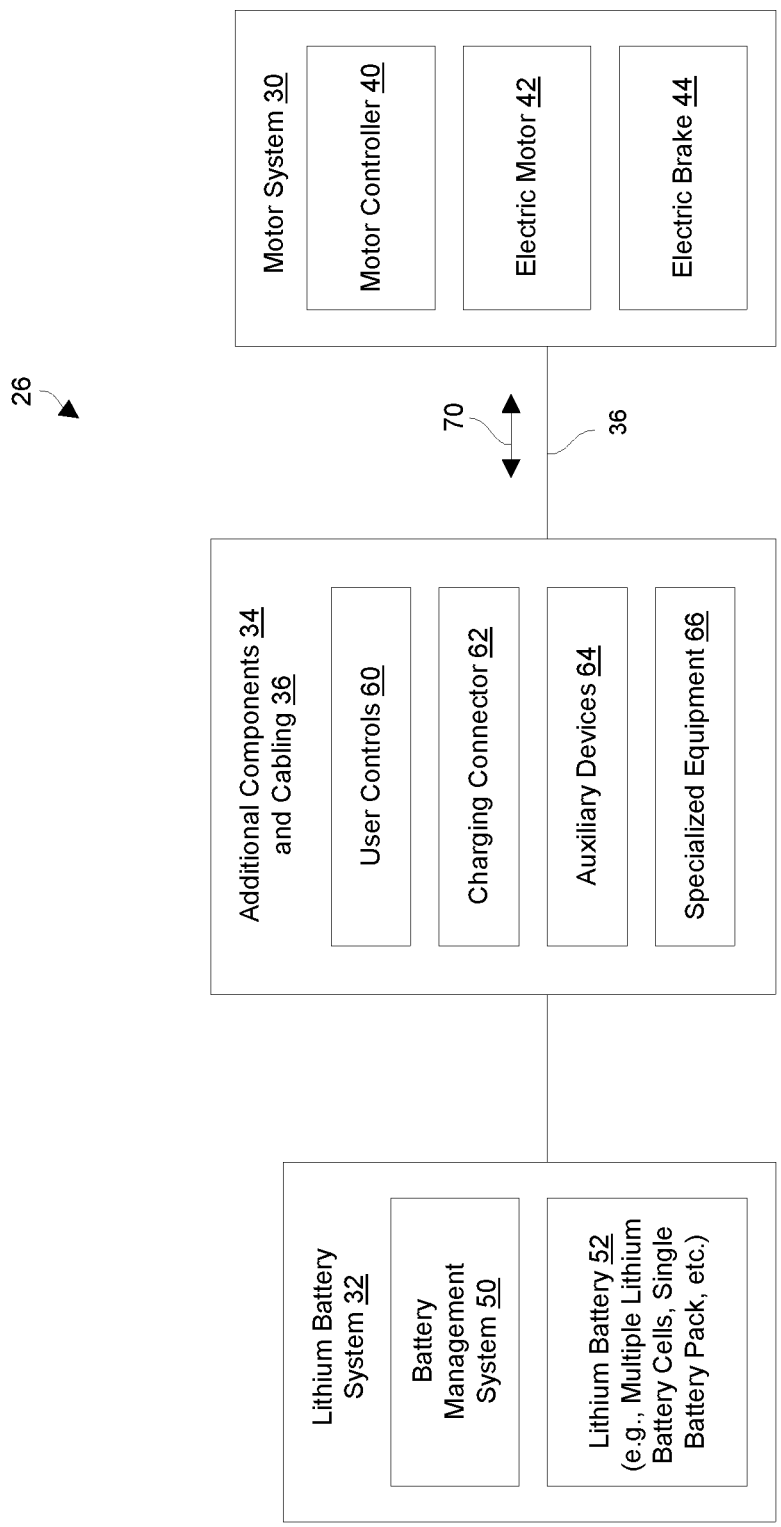
FIG. 2 is a block diagram of particular electrical systems and components of the utility vehicle of FIG. 1 in accordance with some example embodiments.
Figure 3:
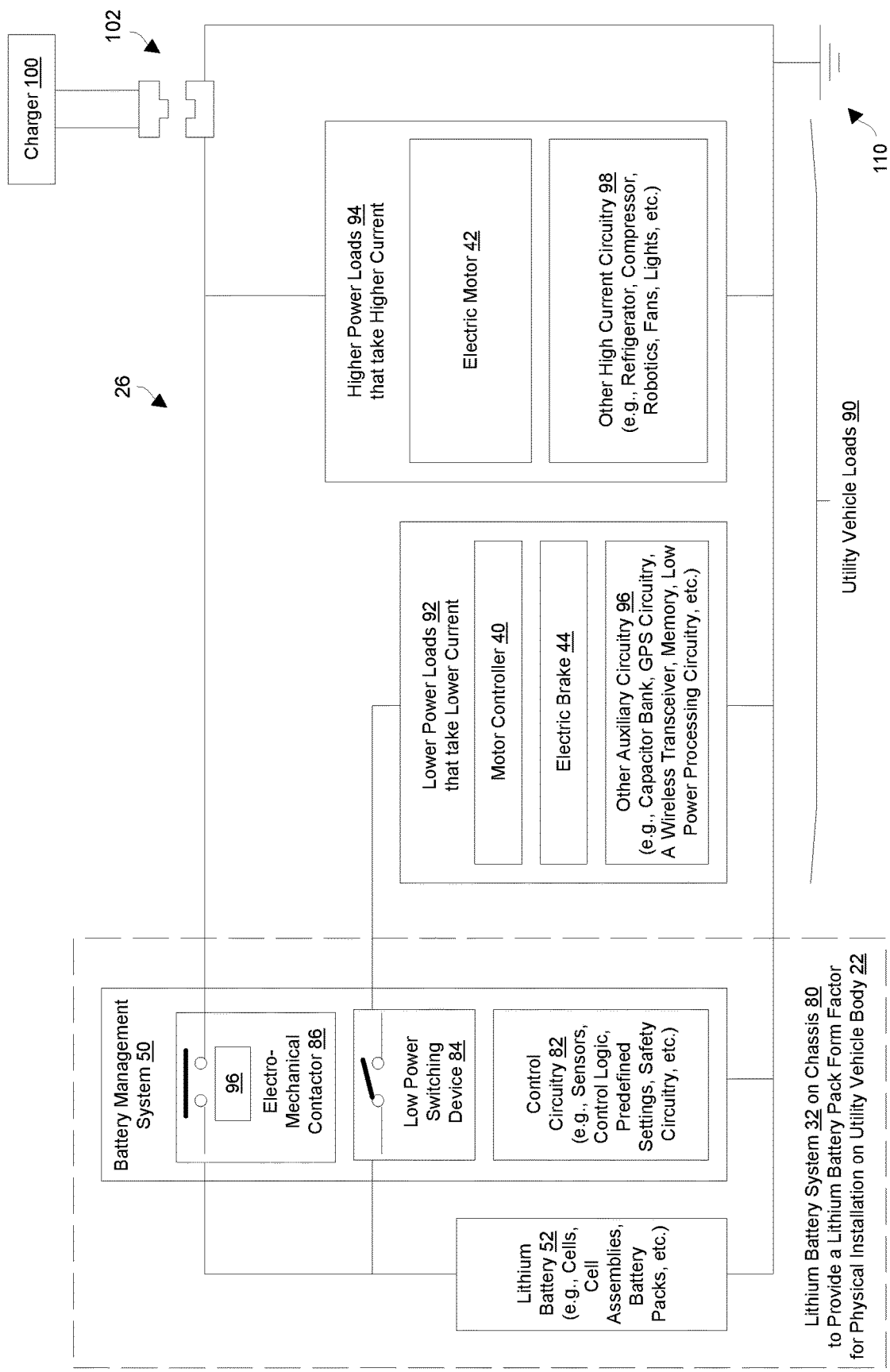
FIG. 3 is a block diagram of certain battery management system details of the utility vehicle of FIG. 1 in accordance with some example embodiments.

FIGS. 2 and 3 show particular details of the electrical system 26 of the utility vehicle 20 in accordance with certain embodiments. FIG. 2 shows particular electrical systems and components of the utility vehicle 20 in accordance with some example embodiments. FIG. 3 shows certain battery management system (BMS) details of the utility vehicle 20 in accordance with some example embodiments.

With reference to FIG. 2, the motor system 30 controls vehicle movement such as drive provided by the set of tires 24 (also see FIG. 1), speed control, braking, and so on thus enabling the utility vehicle 20 to perform useful work. To this end, the motor system 30 includes a motor controller 40, an electric motor 42 which is linked to the set of tires 24, and an electric brake 44 coupled with the electric motor 42. The motor controller 40 of some embodiments controls the application of electric power from the lithium battery system 32 to the electric motor 42 which ultimately turns at least some of the tires 24 to move the utility vehicle 20. Additionally, the motor controller 40 of some embodiments controls delivery of regenerative power from the electric motor 42 to recharge the lithium battery system 32 (e.g., during braking, while the utility vehicle 20 coasts downhill without any pedal depression, etc.).

The electric brake 44 is constructed and arranged to provide mechanical resistance which inhibits turning of the electric motor 42 when the electric brake 44 is unpowered, and to remove the mechanical resistance to release the electric motor 42 thus allowing the electric motor 42 to turn when the electric brake 44 receives power. Accordingly, in some embodiments, when the utility vehicle 20 sits idle, the electric brake 44 remains engaged and the utility vehicle 20 sits in a parked state.

The lithium battery system 32 includes a battery management system (BMS) 50 and a lithium battery 52. The BMS 50 controls electrical access to the lithium battery 52. Additionally, as will be explained in further detail shortly, the BMS 50 of some embodiments responds to various events to prevent excessive discharging of the lithium battery 52 thus safeguarding the lithium battery 52 from becoming over-discharged. In some embodiments, the BMS 50 responds to other events as well such as charging events/situations, fault conditions, and so on to properly and safely control charging and discharging of the lithium battery 52.

It should be understood that a variety of form factors are suitable for the lithium battery system 32. For example, the lithium battery system 32 may take the form factor of a power control assembly that can be mounted/installed as a single unit (or pack). In such a situation, various components may receive support from a chassis (e.g., a dedicated support member, frame or platform) that physically attaches to the utility vehicle body 22.

The additional components 34 and cabling 36 of the electric system 26 may, for example, include user controls 60 (e.g., pedals, switches, etc.), a charging connector 62 (e.g., a plug or receptacle) to connect the electric system 26 to an external power source, auxiliary devices 64 (e.g., a radio, a tablet or similar user device, a GPS circuit, etc.), specialized equipment 66 (e.g., a refrigerator, a compressor, robotics, etc.), and so on.

In some arrangements, the cabling 36 includes a communications bus, such as, for example, a controller area network (CAN) bus through which the motor system 30 and the lithium battery system 32 exchange communications 70 such as electronic CAN messages in accordance with the CAN protocol. In some arrangements, the other electrical components include one or more user signaling devices such as a backup/reverse buzzer, one or more lights, and so on to provide distinctive user notifications.

With reference to FIG. 3 and in accordance with some example embodiments, the lithium battery system 32 may include a chassis 80 (e.g., a platform, an enclosure or housing, a support member, etc.) on or within which other lithium battery system components such as the BMS 50 and the lithium battery 52 may be supported or mounted. In such arrangements, the lithium battery system 32 may take a form factor that is well-suited for installation on to the utility vehicle body 22 (FIG. 1) as a single assembly (e.g., as a power control unit, apparatus, pack, etc.).

The BMS 50 of the lithium battery system 32 includes control circuitry 82, a low power switching device 84, and an electro-mechanical contactor 86. The control circuitry 82 is constructed and arranged to monitor conditions pertaining to the lithium battery 52, communicate with the motor system 30 (FIG. 2), and operate the low power switching device 84 and an electro-mechanical contactor 86 which provide electric power to a set of utility vehicle loads 90. It should be understood that the lithium battery 52 may include an arrangement of cells, cell assemblies, and/or battery packs containing cells. The lithium battery 52 may further include a variety of voltage/current/temperature sensors, etc. which can be accessed by the BMS 50 during operation.

The low power switching device 84 is constructed and arranged to connect the lithium battery 52 to a set of lower power loads 92 that take lower current. To this end, the low power switching device 84 includes a first set of switch contacts coupled with the lithium battery 52 and a second of switch contacts coupled with a lower power bus leading to the set of lower power loads 92. During operation, the low power switching device 84 provides (i) isolation between the first set of switch contacts and the second set of switch contacts in the absence of a switch signal from the control circuitry 82 and (ii) a set of current pathways between the first set of switch contacts and the second set of switch contacts in response to the switch signal from the control circuitry 82.

The electro-mechanical contactor 86 is constructed and arranged to connect the lithium battery 52 to a set of higher power loads 94 that take higher current. To this end, the electro-mechanical contactor 86 includes a first set of switch contacts coupled with the lithium battery 52 and a second of switch contacts coupled with a high power bus leading to the set of higher power loads 94. The electro-mechanical contactor 86 further includes additional componentry 96 such as (i) a bridging element that is movable between a closed position in which the bridging element electrically connects the first set of contactor terminals and the second set of contactor terminals together and an open position in which the bridging element electrically disconnects the first set of contactor terminals and the second set of contactor terminals from each other, (ii) a spring mechanism that biases the bridging element to the open position and (iii) a coil that moves the bridging element to the closed position in response to a contactor signal from the control circuitry. During operation, the electro-mechanical contactor 86 provides (i) isolation between the first set of contactor terminals and the second set of contactor terminals in the absence of a contactor signal from the control circuitry 82 and (ii) a set of current pathways between the first set of contactor terminals and the second set of contactor terminals in response to the contactor signal from the control circuitry 82.

It should be understood that the contactor signal which operates the electro-mechanical contactor 86 may use significantly higher current (e.g., to energize the coil of the contactor 86) than the switch signal which operates the low power switching device 84. In some arrangements the holding current for the electro-mechanical contactor 86 is the tenths of an amp range (e.g., 0.1 amps to less than 1.0 amp) while the current for the switch signal is in the milliamp range (e.g., 0.001 amps to less than 0.010 amp).

In connection with the utility vehicle loads 90, it should be understood that various criteria are suitable for use in distinguishing a lower power load 92 from a higher power load 94. For example, the utility vehicle loads 90 may be separated into lower power loads 92 and high power loads 94 based on comparing their current draw and/or power consumption to a set of predefined thresholds (e.g., X amps, Y watts, etc.). In some arrangements, each lower power load 92 draws approximately 1.0 amp or less during normal operation, while each higher power load 94 draws over 1.0 amp during normal operation. Other thresholds are suitable for use as well to distinguish between a lower power load 92 and a higher power load 94 (e.g., 0.5 amps, 1.5 amps, 2.0 amps, etc.), and so on.

By way of example only, the lower power loads 92 include the motor controller 40, the electric brake 44, and other auxiliary circuitry 96. The auxiliary circuitry 96 may include various auxiliary devices such as a capacitor bank for facilitating operation of the electric motor 42, global positioning system (GPS) circuitry to identify a current geolocation of the utility vehicle 20, a wireless transceiver for wireless communications, memory, low power processing circuitry, and so on. In some arrangements, such auxiliary circuitry 96 is able to run a variety of applications (e.g., to operate a radio having radio station presets, to keep golf score data, to log and report utility vehicle events/status, to perform application specific operations, and so on).

Also by way of example only, the higher power loads 94 include the electric motor 42 and perhaps other high current circuitry 98. Such other high current circuitry 98 may include a refrigerator and/or compressor for a beverage vehicle, robotics, fans, lights, specialized equipment, other devices which may periodically cycle on and draw relatively high current, and so on.

It should be understood that nothing precludes the lower power loads 92 and the higher power loads 94 from being electrically coupled with each other. By way of example, FIG. 3 shows the various components of the electrical system 26 as sharing a common ground 110 (e.g., vehicle or chassis ground).

During operation, the control circuitry 82 opens and closes the electro-mechanical contactor 86 to control delivery of high current to the higher power loads 94. Additionally, the control circuitry 82 opens and closes the low power switching device 84 to control delivery of low current to the lower power loads 92. It should be understood that the control circuitry 82 is able to close the low power switching device 84 while keeping the electro-mechanical contactor 86 open, and vice versa. Such independence between operation of the electro-mechanical contactor 86 and the low power switching device 84 enables the BMS 50 effectively respond to certain user conditions such as frequent pedal pressing (e.g., by closing and opening the electro-mechanical contactor 86) and continued use of auxiliary devices (e.g., by maintaining closure of the low power switching device 84 to maintain power to headlights, a radio, etc.).

Moreover, charging of the lithium battery 52 may be from an external power source such as a charger 100 which connects to the electric system 26 via plugs 102, and may occur through either the electro-mechanical contactor 86 or the low power switching device 84. By way of example only, FIG. 3 shows the charger 100 configured to provide charge to the lithium battery 52 through the electro-mechanical contactor 86 when the plugs 102 are connected. It should be understood that, with these separate current paths available, it is simple to measure and control charging of the lithium battery 52 separately from discharging.

With the configuration as shown in FIG. 3, the control circuitry 82 of the BMS 50 is able to robustly and reliably provide power to the utility vehicle loads 90 from the lithium battery 52, charge the lithium battery 52, and prevent the lithium battery 52 from entering an over-discharged condition. In particular, it should be understood that the lithium battery 52 typically resides in a normal state of charge (SOC) state where the current charge capacity of the lithium battery 52 is within a predefined normal SOC range, i.e., at or below a predefined high state of charge and at or above a predefined low state of charge. For example, the lithium battery may reside in a normal SOC state as long as the lithium battery 52 is at a capacity between 5% and 95%. Other ranges are suitable for use as well (e.g., 10% to 100%, 10% to 90%, 30% to 80%, etc.) and the endpoints of such ranges may be dictated by various criteria such as maximizing battery life, current temperature, voltage deviation between cells, etc.

As long as the current charge capacity of the lithium battery 52 falls within the predefined normal SOC range, the BMS control circuitry 82 maintains closure of the low power switching device 84. Accordingly, the lower power loads 92 continue to have access to power from the lithium battery 52.

Additionally, as long as the current charge capacity of the lithium battery 52 falls within the predefined normal SOC range, the BMS control circuitry 82 operates the electro-mechanical contactor 86. For example, the BMS control circuitry 82 may close the electro-mechanical contactor 86 to deliver power to the electric motor 42 thus enabling the motor system 30 to move the utility vehicle 20. As another example, the BMS control circuitry 82 may close the electro-mechanical contactor 86 in response to connection of the charger 100 to enable the charger 100 to charge the lithium battery 52. As yet another example, the BMS control circuitry 82 may open the electro-mechanical contactor 86 to avoid unnecessarily draining the lithium battery 52 via the coil of the electro-mechanical contactor 86.

The BMS control circuitry 82 includes a safety circuit that protects the lithium battery 50 from entering an over-discharged condition. In particular, the safety circuit monitors the state of charge of the lithium battery 50 and, if the lithium battery transitions from the normal SOC state to a low SOC state, the safety circuit concurrently opens both the electro-mechanical contactor 86 and the low power switching device 84. As a result, there are no loads on the lithium battery 50 that would drain the lithium battery 50. The safety circuit may continue keeping the electro-mechanical contactor 86 and the low power switching device 84 open until the BMS control circuitry 82 detects charging from the charger 100.

A charger, which is similar to the charger 100 and which can be used to charge the utility vehicle 20, is described in U.S. patent application Ser. No. 15/419,556 entitled "Charging a Lithium Battery on a Utility Vehicle", the contents and teachings of which are hereby incorporated by reference in their entirety. Further details will now be provided with reference to FIG. 4.

Figure 4:
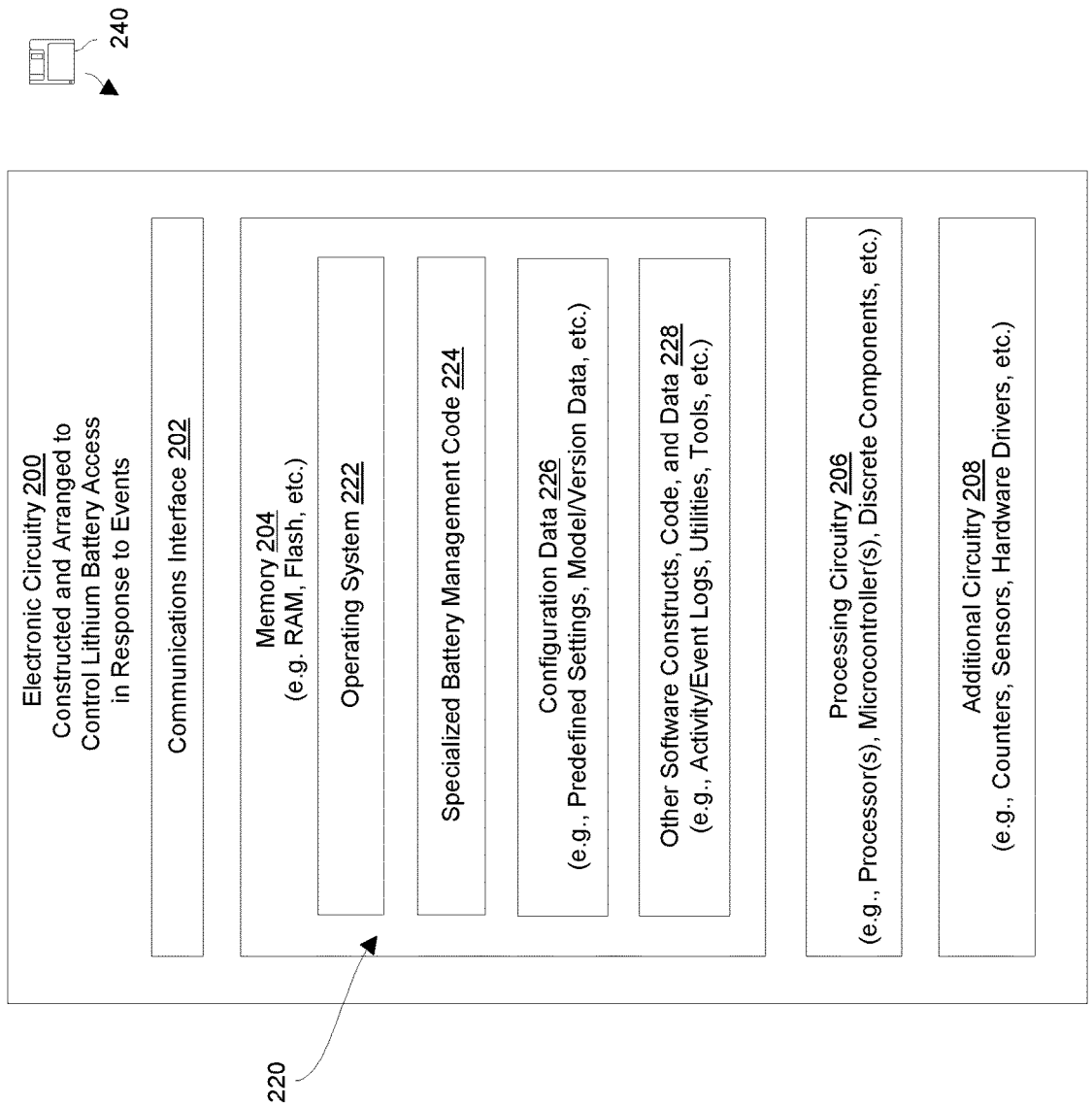
FIG. 4 is a block diagram of particular details of an electric circuit which is suitable for at least a portion of a battery management system of FIG. 3 in accordance with some example embodiments.

FIG. 4 shows details of electronic circuitry 200 that may form at least a portion of the BMS control circuitry 82. The electronic circuitry 200 includes, in an example embodiment, a communications interface 202, memory 204, processing circuitry 206, and additional circuitry 208. Such components may form all or part of the control logic for storing and accessing various predefined settings/thresholds, safety circuitry, controller circuitry, etc.

The communications interface 202 is constructed and arranged to connect the electronic circuitry 200 to one or more communications media such as a controller area network (CAN) bus (also see the cabling 36 in FIGS. 1 and 2). Such communications may include different media such as copper-based (e.g., USB, RJ45, low voltage cabling, etc.), fiber optic communications, wireless communications (i.e., WiFi, cellular, Bluetooth, etc.), infrared, combinations thereof, and so on.

The memory 204 stores a variety of memory constructs 220 including an operating system 222, specialized battery management code 224, configuration data 226 (e.g., identification data, predefined settings/thresholds, charging settings, version data, model data, etc.), and other software constructs, code and data 228 (e.g., activity/event logs, utilities, tools, etc.). Although the memory 204 is illustrated as a single block in FIG. 4, the memory 204 is intended to represent both volatile and non-volatile storage (e.g., random access memory, flash memory, etc.), and may, in some embodiments, include a plurality of discrete physical memory units.

The processing circuitry 206 is configured to run in accordance with instructions of the various memory constructs 220 stored in the memory 204. In particular, the processing circuitry 206 runs the operating system 222 to manage various computerized resources (e.g., processor cycles, memory allocation, etc.). Additionally, the processing circuitry 206 runs the specialized battery management code 224 to electronically control access to the lithium battery 52 (FIGS. 2 and 3). The processing circuitry 206 may be implemented in a variety of ways including via one or more processors (or cores) running specialized software, application specific ICs (ASICs), field programmable gate arrays (FPGAs) and associated programs, microcontrollers, discrete components, analog circuits, other hardware circuitry, combinations thereof, and so on. In the context of one or more processors executing software, a computer program product 240 is capable of delivering all or portions of the software to the electronic circuitry 200 (e.g., also see the memory constructs 220 in FIG. 4). The computer program product 240 has a non-transitory (or non-volatile) computer readable medium which stores a set of instructions which controls one or more operations of the electronic circuitry 200. Examples of suitable computer readable storage media include tangible articles of manufacture and other apparatus which store instructions in a non-volatile manner such as flash memory, a magnetic storage medium (e.g., various disk memories such as a hard drive, floppy disk, or other magnetic storage medium), tape memory, optical disk (e.g., CD-ROM, DVD, Blu-Ray, or the like), and the like. It will be appreciated that various combinations of such computer readable storage media may be used to provide the computer readable medium of the computer program product 240 in some embodiments.

The additional circuitry 208 represents other circuitry of the electronic circuit 200. Such circuitry may include hardware counters, signal drivers, connectors, sensors, and so on. In some arrangements, where the utility vehicle is specialized equipment (e.g., a food and beverage vehicle, an ATV, etc.) the additional circuitry 208 may represent other components such as an switches, electronic thermostat, lighting control, and so on. Further details will now be provided with reference to FIG. 5.

Figure 5:
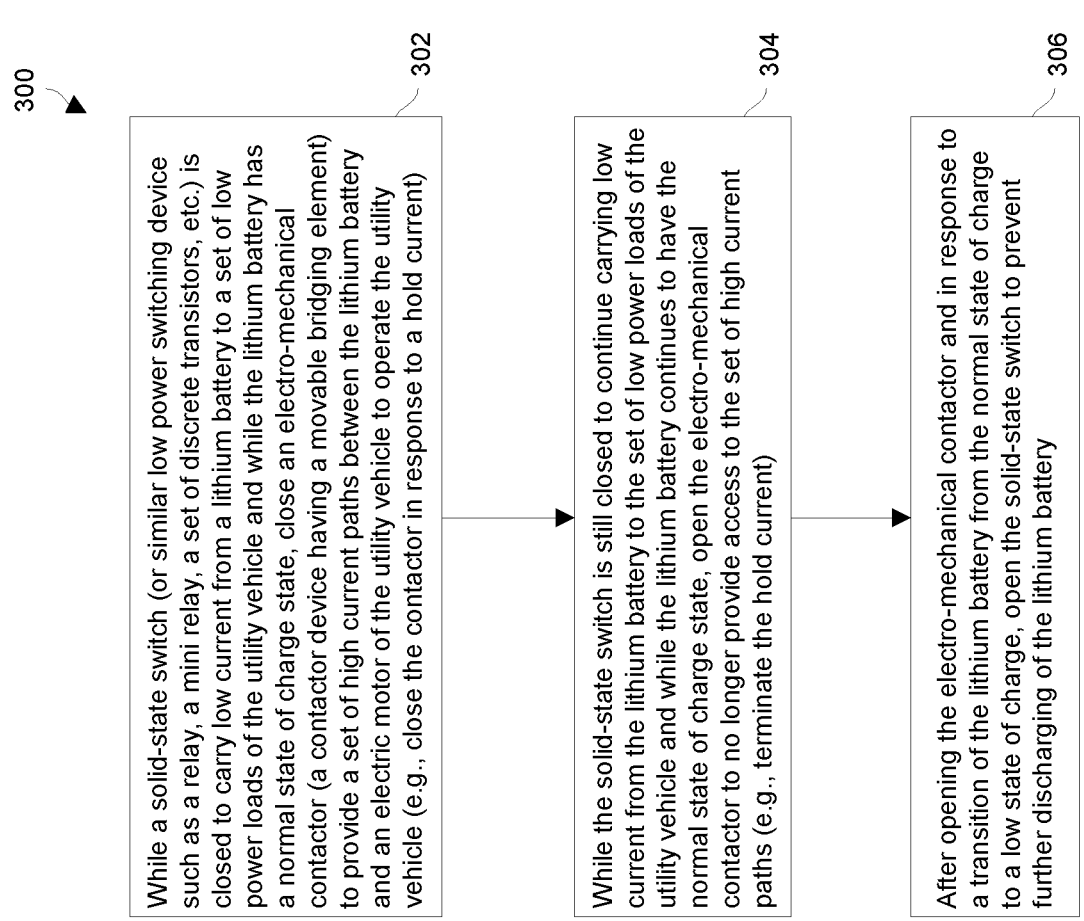
FIG. 5 is a flowchart of a procedure which is performed by a battery management system in accordance with some example embodiments.

FIG. 5 is a flowchart of a procedure 300 which is performed by control circuitry of a BMS to control power delivery to loads of a utility vehicle in accordance with some example embodiments. Such a procedure 300 not only enables the utility vehicle to operate and thus perform useful work, but also safeguards a lithium battery from reaching an over-discharged condition.

At 302, while a solid-state switch is closed to carry low current from the lithium battery to a set of low power loads of the utility vehicle and while the lithium battery has a normal SOC state, the control circuitry closes an electro-mechanical contactor to provide a set of high current paths between the lithium battery to an electric motor of the utility vehicle (e.g., to operate the electric motor of the utility vehicle). During this time, the solid-state switch is able to power a variety of loads that draw little current such as a capacitor bank that facilitates operation of the electric motor, GPS circuitry, a wireless transceiver, computerized circuitry for event and status logging, other auxiliary devices, and so on. Concurrently, the electro-mechanical contactor is able to power the electric motor of the utility vehicle and perhaps other high power devices (e.g., a fan, robotics, etc.).

It should be understood that the control circuitry provides a contactor signal to the electro-mechanical contactor to hold the electro-mechanical contactor in the closed position in order to provide electrical access to the lithium battery. While the electro-mechanical contactor is closed, the lithium battery is able to deliver power to the electric motor. Additionally, the lithium battery may receive regenerative power from the electric motor or power from an external charger (also see FIG. 3) while the electro-mechanical contactor is closed.

At 304, while the solid-state switch is still closed to continue carrying low current from the lithium battery to the set of low power loads of the utility vehicle and while the lithium battery continues to have the normal SOC state, the control circuitry opens the electro-mechanical contactor to no longer provide access to the set of high current paths. Opening of the electro-mechanical contactor prevents the lithium battery from losing power unnecessarily since the hold current that holds the electro-mechanical contactor closed is no longer provided.

For example, suppose that a user of the utility vehicle is no longer driving. In such a situation, the motor system of the utility system may inform the control circuitry that high current is no longer needed for the electric motor.

As another example, the user may have connected an external charger to the utility vehicle to charge the lithium battery and the lithium battery may have become fully charged. In such a situation, the control circuitry may decide on its own to open the electro-mechanical contactor to prevent overcharging of the lithium battery.

It should be understood that, although the control circuitry opens the electro-mechanical contactor by terminating a contactor signal that holds the electro-mechanical contactor closed, the solid-state switch remains closed so that the low power loads can continue to operate. Such operation reduces drain on the lithium battery but does not deprive the utility of its ability to perform various auxiliary operations such as precharging the electric motor capacitor bank, identifying a current geolocation of the utility vehicle, logging events and status, and so on.

At 306, after opening the electro-mechanical contactor and in response to a transition of the lithium battery from the normal SOC state to a low SOC state, the control circuitry opens the solid-state switch to prevent further discharging of the lithium battery. Here, based on sensor readings, the control circuitry may have determined that the lithium battery has crossed a predefined capacity threshold and should not be drained any further. With both the electro-mechanical contactor and the solid-state switch now open, there are no loads on the lithium battery and the lithium battery is safeguarded from becoming over-discharged.

It should be understood that the procedure 300 was described above as using a solid-state switch as a low power switching mechanism by way of example only. Other low power switching circuitry is suitable for use as well such as a relay, a mini relay, a set of discrete transistors, and the like.

Moreover, in accordance with certain embodiments, one should appreciate that the electro-magnetic contactor which is used to control current to the electric motor is a device which is constructed and arranged to carry a relatively large current vis-à-vis a solid state switch or similar low power switching device. To this end, the electro-magnetic contactor may include a set of movable bridging elements (e.g., metal disks, bars, etc.) which is spring-biased out of contact with the contactor leads but which is moved into contact with the contactor leads to provide a set of conductive pathways between the contactor leads when the contactor signal actuates the contactor's electromagnet. In some arrangements, the electro-magnetic contactor is configured to carry at least 100 amps (e.g., up to 200 amps) sufficient to power the electric motor, while the low power switching device (e.g., a solid state switch, a relay, etc.) is configured to handle enough current for the auxiliary loads (e.g., no more than 40 to 50 amps).

As described above, improved techniques are directed to provisioning a utility vehicle with a power control assembly having an electro-mechanical contactor 86 to carry high current and a low power switching device 84 to carry low current (e.g., see the lithium battery system 32 in FIG. 3). Such a power control assembly is able to effectively and efficiently control power delivery from a lithium battery 52 to the various utility vehicle loads 90 as well as prevent the lithium battery 52 from over-discharging to an unsafe level. Moreover, such a power control assembly does not require multiple high-current contactors (i.e., one for the traction control system and another for the lithium-battery pack). Rather, the electro-mechanical contactor 86 operates to carry high current (e.g., for electric motor operation) and the low power switching device 84 operates to carry low current (e.g., to power a set of low-power loads of the utility vehicle 20). If the amount of charge on the lithium battery 52 drops to a predefined level, both the electro-mechanical contactor 86 and the low power switching device 84 can open in order to prevent further discharging of the lithium battery 52.

It should be understood that the improvements disclosed herein are well suited for application in the field of lithium battery powered utility vehicles with a battery management system (BMS). Such an application addresses power delivery via a traction power feed (e.g., to the electric motor) and an auxiliary power feed (e.g., to auxiliary loads).

That is, lithium ion battery packs for light duty off road battery electric vehicles (BEV) may include battery management systems (BMSs) that can electrically disconnect the battery pack from the vehicle. There are reasons to disconnect the battery pack from the vehicle. One reason is to protect the battery from potentially harmful conditions. Another reasons is to conserve energy during periods of inactivity. Disconnecting the battery from the vehicle disables all electrical loads including traction power and accessory power.

With the improvements disclosed herein and in accordance with certain embodiments, an auxiliary power output from a BEV battery pack can be selectively enabled by the BMS independent from the traction power output. The auxiliary power output may supply power directly from the batteries at battery voltage (e.g., 48 volts), or it may supply power at a different voltage (e.g., 24 volts, 12 volts, etc.) through the use of a DC-DC converter or other power conversion device.

With an electrical system that uses only one contactor, there is relatively low system cost (e.g., a dedicated vehicle traction power disconnect may be eliminated). Also, in certain embodiments, BEV motor controllers must precharge a capacitor bank before closing a traction power contactor and the auxiliary power output could easily be used to power the motor controller processing unit and charge the capacitor bank before closing the battery pack's traction power contactor. If the motor controller wants to disconnect power to the traction drive then it can do so by sending a signal to the BMS.

Another advantage of certain embodiments is that quiescent power draw on the battery (including the power required to maintain the connections) is reduced. Rather, an auxiliary power output may be maintained to a solid state device which is more efficient than an electro-mechanical contactor.

Another advantage of certain embodiments is that the battery pack may supply auxiliary power at a voltage level that matches the needs of common, readily available accessories. For example, in some embodiments, a 48 volt lithium battery pack includes a converter to change the voltage to 12 volts in order to supply power to 12 volt accessories.

Another advantage of certain embodiments is that the BMS may selectively disconnect traction power while enabling auxiliary power. This enables the BMS to continuously supply power to accessories that require it to retain short term memory, such as GPS satellite connection information, radio station presets, or golf scores. This also enables the BMS to selectively maintain power to accessories such as headlights, while disabling traction power.

Another advantage of certain embodiments is that the BMS could use more accurate current sensors to measure auxiliary power. Single power output current sensors must be sized to measure peak current. Sensors with high current capabilities are less accurate at measuring low current as compared to sensors with smaller current ranges. However, in certain embodiments, the BMS may access certain sensors that accurately read high currents (e.g., many amps) and other sensors that accurately read low currents (e.g., milliamps).

In some embodiments, an auxiliary power output could be used for electrically connecting the batteries to the vehicle's battery charger. This allows the BMS to measure and control charging separately from discharging.

An alternative solution to providing an auxiliary power output is to add another power source such as an auxiliary lead acid or lithium battery pack. However, these separate battery systems are costly and add system complexity.

In contrast, in accordance with certain embodiments, the lithium battery pack has separate, independent traction and auxiliary power connections. The lithium battery pack further includes supporting electronics and power management software to manage connection of the battery to traction systems, accessories, and battery chargers.

While various embodiments of the present disclosure have been particularly shown and described, it will be understood by those skilled in the art that various changes in form and details may be made therein without departing from the spirit and scope of the present disclosure as defined by the appended claims.

For example, the utility vehicle was described above in the context of a golf car. It should be understood that other types of vehicles are suitable for use as well such as aircraft, watercraft, hybrid vehicles, and so on. Such modifications and enhancements are intended to belong to various embodiments of the disclosure.

What is claimed is:

1. A power control assembly to control power delivery to a utility vehicle, the power control assembly comprising:
    an electro-mechanical contactor constructed and arranged to carry high current;
    a low power switching device constructed and arranged to carry low current; and
    control circuitry coupled to the electro-mechanical contactor and the low power switching device, the control circuitry being constructed and arranged to separately open and close each of the electro-magnetic contactor and the low power switching device to control power delivery from a lithium battery to a set of loads of the utility vehicle.

2. A power control assembly as in claim 1, further comprising:
    a lithium battery coupled to each of the electro-mechanical contactor, the low power switching device, and the control circuitry;
    wherein the lithium battery provides power to the control circuitry to enable the control circuitry to open and close each of the electro-magnetic contactor and the low power switching device.

3. A power control assembly as in claim 2, further comprising:
    an assembly chassis on which the electro-mechanical contactor, the low power switching device, the control circuitry, and the lithium battery are mounted, the assembly chassis providing the power control assembly with a form factor that enables the power control assembly to be physically installed on to the utility vehicle as a single unit.

4. A power control assembly as in claim 1 wherein the control circuitry is constructed and arranged to:
open both the electro-mechanical contactor and the low power switching device concurrently to prevent further discharging of the lithium battery,
open the electro-mechanical contactor and close the low power switching device concurrently to deliver power at low current to the set of loads of the utility vehicle, and
close both the electro-mechanical contactor and the low power switching device concurrently to deliver both power at high current and power at low current to the set of loads of the utility vehicle.

5. A power control assembly as in claim 4 wherein the electro-mechanical contactor includes a first set of contactor terminals that couple to the lithium battery and a second set of contactor terminals constructed and arranged to connect to an electric motor bus leading to an electric motor of the utility vehicle; and
wherein the low power switching device includes a first set of switch contacts that couple to the lithium battery and a second set of switch contacts constructed and arranged to connect to a low power bus leading to low power electronic components of the utility vehicle.

6. A power control assembly as in claim 5 wherein the electro-mechanical contactor includes (i) a bridging element that is movable between a closed position in which the bridging element electrically connects the first set of contactor terminals and the second set of contactor terminals together and an open position in which the bridging element electrically disconnects the first set of contactor terminals and the second set of contactor terminals from each other, (ii) a spring mechanism that biases the bridging element to the open position and (iii) a coil that moves the bridging element to the closed position in response to a contactor signal from the control circuitry; and
wherein the low power switching device includes a solid-state switch that is constructed and arranged to provide (i) isolation between the first set of switch contacts and the second set of switch contacts in the absence of a switch signal from the control circuitry and (ii) a set of current pathways between the first set of switch contacts and the second set of switch contacts in response to the switch signal from the control circuitry.

7. A power control assembly as in claim 6 wherein the contactor signal has a first current;
wherein the switch signal has a second current; and
wherein the first current is higher than the second current.

8. A power control assembly as in claim 5 wherein the control circuitry includes:
a safety circuit that protects the lithium battery from entering an over-discharged condition, the safety circuit keeping both the electro-mechanical contactor and the low power switching device concurrently open when the lithium battery has transitioned from a normal state of charge state to a low state of charge state.

9. A power control assembly as in claim 8 wherein the safety circuitry is constructed and arranged to:
draw power from the lithium battery to (i) close the low power switching device and (ii) enable closure of the electro-mechanical contactor when the lithium battery has at least a predefined amount of charge, and
no longer draw power from the lithium battery (i) open the low power switching device and (ii) disable closure of the electro-mechanical contactor when the lithium battery has less than the predefined amount of charge.

10. A power control assembly as in claim 8 wherein the safety circuit includes:
a first set of current sensors that measure current provided by the lithium battery through the electro-mechanical contactor, and
a second set of current sensors that measure current provided by the lithium battery through the low power switching device.

11. A power control assembly as in claim 8 wherein, when the lithium battery is in the normal state of charge state, the control circuitry (i) enables the electro-mechanical contactor to transition between an opened position and a closed position and (ii) maintains closure of the low power switching device.

12. A power control assembly as in claim 11 wherein the control circuitry is constructed and arranged to:
close the electro-mechanical contactor when the lithium battery is in the normal state of charge state and the control circuitry receives an "energize motor" command signal from a motor controller of the utility vehicle, and
open the electro-mechanical contactor when the lithium battery is in the normal state of charge state and the control circuitry no longer receives the "energize motor" command signal from the motor controller of the utility vehicle.

13. A power control assembly as in claim 11 wherein the control circuitry is constructed and arranged to:
close the electro-mechanical contactor when the lithium battery is in the normal state of charge state, the control circuitry receives an "external charger present" signal from a motor controller of the utility vehicle, and the lithium battery is less than fully charged, and
open the electro-mechanical contactor when the lithium battery is in the normal state of charge state, the control circuitry receives the "external charger present" signal from the motor controller of the utility vehicle, and the lithium battery is fully charged.

14. A power control assembly as in claim 1 wherein the set of low power loads of the utility vehicle includes persistent memory that stores a log of utility vehicle events; and
wherein the control circuitry includes a communications interface constructed and arranged to provide lithium battery status for entrance in the log stored in the persistent memory.

15. A power control assembly as in claim 5 wherein the electro-mechanical contactor provides a first voltage when the electro-mechanical contactor is closed;
wherein the low power switching device provides a second voltage when the low power switching device is closed; and
wherein the first voltage is higher than the second voltage.

16. A power control assembly as in claim 5 wherein the electro-mechanical contactor provides a first voltage when the electro-mechanical contactor is closed;
wherein the low power switching device provides a second voltage when the low power switching device is closed; and
wherein the first voltage and the second voltage are equal.

17. A power control assembly as in claim 5 wherein the set of low power loads of the utility vehicle includes persistent memory that stores a log of utility vehicle events; and wherein the control circuitry is constructed and arranged to provide power to the persistent memory through the low power switching device and write lithium battery status to the log stored in the persistent memory.

18. A utility vehicle, comprising:
a utility vehicle body;
a set of electrical loads supported by the utility vehicle body; and
a power control assembly supported by the utility vehicle body and coupled with the set of electrical loads, the power control assembly including:
an electro-mechanical contactor constructed and arranged to carry high current,
a low power switching device constructed and arranged to carry low current, and
control circuitry coupled to the electro-mechanical contactor and the low power switching device, the control circuitry being constructed and arranged to separately open and close each of the electro-magnetic contactor and the low power switching device to control power delivery from a lithium battery to the set of electrical loads.

19. A utility vehicle as in claim 18 wherein the set of loads includes (i) an electric motor coupled to the electro-mechanical contactor and (ii) auxiliary loads coupled to the low power switching device;
wherein the electro-mechanical contactor controls delivery of traction power to the electric motor; and
wherein the low power switching device controls delivery of auxiliary power to the auxiliary loads.

20. A method of controlling power delivery to loads of a utility vehicle, the method comprising:
while a solid-state switch is closed to carry low current from a lithium battery to a set of low power loads of the utility vehicle and while the lithium battery has a normal state of charge state, closing an electro-mechanical contactor to provide a set of high current paths between the lithium battery and an electric motor of the utility vehicle;
while the solid-state switch is still closed to continue carrying low current from the lithium battery to the set of low power loads of the utility vehicle and while the lithium battery continues to have the normal state of charge state, opening the electro-mechanical contactor to no longer provide the set of high current paths between the lithium battery and the electric motor of the utility vehicle; and
after opening the electro-mechanical contactor and in response to a transition of the lithium battery from the normal state of charge state to a low state of charge state, opening the solid-state switch to prevent further discharging of the lithium battery.

* * * * *